(12) United States Patent
Chang et al.

(10) Patent No.: US 9,116,723 B2
(45) Date of Patent: Aug. 25, 2015

(54) COMMUNICATION DEVICE OR MEDIA DEVICE FOR PROVIDING PHONE CALLING SERVICE, INTERNET ACCESS SERVICE, OR DIGITAL CONTENT SERVICE

(71) Applicant: Flexiworld Technologies, Inc., Portland, OR (US)

(72) Inventors: William Ho Chang, Vancouver, WA (US); Vinaynathan Viswanathan, Pune (IN)

(73) Assignee: Flexiworld Technologies, Inc., Vancouver, WA (US)

( * ) Notice: Subject to any disclaimer, the term of this patent is extended or adjusted under 35 U.S.C. 154(b) by 0 days.

(21) Appl. No.: 14/089,622

(22) Filed: Nov. 25, 2013

(65) Prior Publication Data

US 2014/0082604 A1    Mar. 20, 2014

Related U.S. Application Data

(63) Continuation of application No. 12/891,594, filed on Sep. 27, 2010, now Pat. No. 8,595,717, which is a continuation of application No. 10/823,513, filed on Apr. 12, 2004, now Pat. No. 7,805,720, and a (Continued)

(51) Int. Cl.
  *G06F 9/44*    (2006.01)
  *G06F 9/445*   (2006.01)

(52) U.S. Cl.
  CPC ............................ *G06F 9/445* (2013.01)

(58) Field of Classification Search
  CPC .................................................. G06F 9/445
  USPC .................................................. 717/168–178
  See application file for complete search history.

(56) References Cited

U.S. PATENT DOCUMENTS 5,166,809 A    11/1992   Surbrook
5,220,674 A     6/1993   Morgan et al.

(Continued)

FOREIGN PATENT DOCUMENTS

CN    1345497 A    4/2002
EP    0473987 B1   11/1995

(Continued)

OTHER PUBLICATIONS

Wong, An Embedded Chip for USB Application: from the Architecture to Implementation, International IC 1999, Conference Proceedings, pp. 1-10.*

(Continued)

*Primary Examiner* — Satish Rampuria
(74) *Attorney, Agent, or Firm* — Kolisch Hartwell, PC

(57) ABSTRACT

A portable device for phone calling, Internet access, or for playing media is herein disclosed and enabled. The portable device may support autorun. The portable device is connectable to a computing device over a wired interface for running, at the computing device, at least part of the software stored in the portable device. The wired interface includes, for example, a USB, a SD card, or an Ethernet among others. A wireless interface, such as Wi-Fi and Bluetooth®, may additionally be included. Exemplary services that may be deployed with the portable device include a phone calling service. Other exemplary services may include adding a wireless interface to a computing device, or providing a wireless Internet access service. Additional exemplary services may include outputting or playing of digital content from a smart phone to an output device, such as a printer, projector or television.

20 Claims, 7 Drawing Sheets

Related U.S. Application Data continuation-in-part of application No. 10/734,481, filed on Dec. 12, 2003.

(60) Provisional application No. 60/462,080, filed on Apr. 11, 2003, provisional application No. 60/433,196, filed on Dec. 12, 2002.

(56) References Cited

U.S. PATENT DOCUMENTS

| | | | |
|---|---|---|---|
| 5,287,194 | A | 2/1994 | Lobiondo |
| 5,337,258 | A | 8/1994 | Dennis |
| 5,404,433 | A | 4/1995 | Hosogai |
| 5,412,798 | A | 5/1995 | Garney |
| 5,519,641 | A | 5/1996 | Beers et al. |
| 5,564,109 | A | 10/1996 | Snyder et al. |
| 5,580,177 | A | 12/1996 | Gase et al. |
| 5,596,697 | A | 1/1997 | Foster et al. |
| 5,604,843 | A | 2/1997 | Shaw et al. |
| 5,613,123 | A | 3/1997 | Tsang et al. |
| 5,619,649 | A | 4/1997 | Kovnat et al. |
| 5,699,495 | A | 12/1997 | Snipp |
| 5,705,781 | A | 1/1998 | Habedank et al. |
| 5,761,480 | A | 6/1998 | Fukada et al. |
| 5,832,191 | A | 11/1998 | Thorne |
| 5,867,633 | A | 2/1999 | Taylor et al. |
| 5,911,044 | A | 6/1999 | Lo et al. |
| 5,933,498 | A | 8/1999 | Schneck et al. |
| 5,940,843 | A | 8/1999 | Zucknovich et al. |
| 5,982,520 | A | 11/1999 | Weiser et al. |
| 5,987,454 | A | 11/1999 | Hobbs |
| 6,009,464 | A | 12/1999 | Hamilton et al. |
| 6,020,973 | A | 2/2000 | Levine et al. |
| 6,043,898 | A | 3/2000 | Jacobs |
| 6,044,428 | A | 3/2000 | Rayabhari |
| 6,046,820 | A | 4/2000 | Konishi |
| 6,070,185 | A | 5/2000 | Anupam et al. |
| 6,119,153 | A | 9/2000 | Dujari et al. |
| 6,138,178 | A | 10/2000 | Watanabe |
| 6,141,659 | A | 10/2000 | Barker et al. |
| 6,148,346 | A | 11/2000 | Hanson |
| 6,167,514 | A | 12/2000 | Matsui et al. |
| 6,202,023 | B1 | 3/2001 | Hancock et al. |
| 6,216,183 | B1 | 4/2001 | Rawlins |
| 6,225,993 | B1 | 5/2001 | Lindblad et al. |
| 6,233,611 | B1 | 5/2001 | Ludtke et al. |
| 6,246,486 | B1 | 6/2001 | Takahashi |
| 6,251,014 | B1 * | 6/2001 | Stockdale et al. ............... 463/16 |
| 6,256,666 | B1 | 7/2001 | Singhal |
| 6,263,387 | B1 | 7/2001 | Chrabaszcz |
| 6,263,392 | B1 * | 7/2001 | McCauley .................... 710/305 |
| 6,279,153 | B1 | 8/2001 | Bi et al. |
| 6,282,710 | B1 | 8/2001 | Boehler |
| 6,285,889 | B1 | 9/2001 | Nykanen et al. |
| 6,288,790 | B1 | 9/2001 | Yellepeddy et al. |
| 6,324,521 | B1 | 11/2001 | Shiota et al. |
| 6,330,611 | B1 | 12/2001 | Itoh et al. |
| 6,353,928 | B1 | 3/2002 | Altberg et al. |
| 6,363,452 | B1 | 3/2002 | Lach |
| 6,366,912 | B1 | 4/2002 | Wallent et al. |
| 6,366,965 | B1 | 4/2002 | Binford et al. |
| 6,366,966 | B1 | 4/2002 | Laney et al. |
| 6,370,686 | B1 | 4/2002 | Delo et al. |
| 6,379,058 | B1 | 4/2002 | Petteruti et al. |
| 6,389,010 | B1 | 5/2002 | Kubler et al. |
| 6,389,159 | B2 | 5/2002 | Gilman et al. |
| 6,405,362 | B1 | 6/2002 | Shih et al. |
| 6,418,439 | B1 | 7/2002 | Papierniak et al. |
| 6,418,554 | B1 | 7/2002 | Delo et al. |
| 6,421,748 | B1 | 7/2002 | Lin et al. |
| 6,434,535 | B1 | 8/2002 | Kupka et al. |
| 6,449,052 | B1 | 9/2002 | Sherer et al. |
| 6,452,692 | B1 | 9/2002 | Yacoub |
| 6,453,127 | B2 | 9/2002 | Wood et al. |
| 6,473,800 | B1 | 10/2002 | Jerger et al. |
| 6,477,575 | B1 | 11/2002 | Koeppel et al. |
| 6,480,292 | B1 | 11/2002 | Sugiyama |
| 6,484,219 | B1 * | 11/2002 | Dunn et al. ..................... 710/42 |
| 6,487,587 | B1 | 11/2002 | Dubey |
| 6,487,599 | B1 | 11/2002 | Smith et al. |
| 6,493,104 | B1 | 12/2002 | Cromer et al. |
| 6,529,522 | B1 | 3/2003 | Ito et al. |
| 6,546,387 | B1 | 4/2003 | Triggs |
| 6,546,419 | B1 | 4/2003 | Humpleman et al. |
| 6,553,431 | B1 | 4/2003 | Yamamoto et al. |
| 6,556,313 | B1 | 4/2003 | Chang et al. |
| 6,584,903 | B2 | 7/2003 | Jacobs |
| 6,590,588 | B2 | 7/2003 | Lincke et al. |
| 6,594,723 | B1 | 7/2003 | Chapman et al. |
| 6,600,569 | B1 | 7/2003 | Osada et al. |
| 6,603,744 | B2 | 8/2003 | Mizutani et al. |
| 6,604,135 | B1 | 8/2003 | Rogers et al. |
| 6,607,314 | B1 | 8/2003 | McCannon et al. |
| 6,608,928 | B1 | 8/2003 | Queiroz |
| 6,611,812 | B2 | 8/2003 | Hurtado et al. |
| 6,623,527 | B1 | 9/2003 | Hamzy |
| 6,625,472 | B1 | 9/2003 | Farazmandnia et al. |
| 6,625,761 | B1 * | 9/2003 | Sartore et al. .................... 714/43 |
| 6,628,417 | B1 | 9/2003 | Naito et al. |
| 6,633,395 | B1 | 10/2003 | Tuchitoi et al. |
| 6,636,929 | B1 * | 10/2003 | Frantz et al. ................... 710/313 |
| 6,654,135 | B2 | 11/2003 | Mitani |
| 6,658,625 | B1 | 12/2003 | Allen |
| 6,671,068 | B1 | 12/2003 | Chang et al. |
| 6,678,751 | B1 | 1/2004 | Hays et al. |
| 6,694,371 | B1 | 2/2004 | Sanai |
| 6,697,848 | B2 | 2/2004 | Hamilton et al. |
| 6,701,009 | B1 | 3/2004 | Makoto et al. |
| 6,705,781 | B2 | 3/2004 | Iwazaki |
| 6,730,686 | B1 | 5/2004 | Baynes et al. |
| 6,735,766 | B1 | 5/2004 | Chamberlain et al. |
| 6,735,768 | B1 | 5/2004 | Tanaka |
| 6,745,229 | B1 | 6/2004 | Gobin et al. |
| 6,745,255 | B2 | 6/2004 | Yen et al. |
| 6,751,732 | B2 | 6/2004 | Strobel et al. |
| 6,753,978 | B1 | 6/2004 | Chang |
| 6,757,070 | B1 | 6/2004 | Lin et al. |
| 6,757,783 | B2 | 6/2004 | Koh |
| 6,760,745 | B1 | 7/2004 | Tan et al. |
| 6,772,233 | B2 | 8/2004 | Iida et al. |
| 6,785,727 | B1 | 8/2004 | Yamazaki |
| 6,788,428 | B1 | 9/2004 | Shimokawa |
| 6,798,530 | B1 | 9/2004 | Buckley et al. |
| 6,826,632 | B1 | 11/2004 | Wugofski |
| 6,829,672 | B1 | 12/2004 | Deng et al. |
| 6,839,771 | B1 * | 1/2005 | Bouchier et al. ............... 709/253 |
| 6,840,441 | B2 | 1/2005 | Monaghan et al. |
| 6,857,716 | B2 | 2/2005 | Nagahashi |
| 6,859,228 | B1 | 2/2005 | Chang et al. |
| 6,885,362 | B2 | 4/2005 | Suomela |
| 6,889,058 | B2 | 5/2005 | Tordera |
| 6,898,652 | B2 | 5/2005 | Peters et al. |
| 6,941,014 | B2 | 9/2005 | Lin et al. |
| 6,944,687 | B2 | 9/2005 | Doragh et al. |
| 6,947,995 | B2 | 9/2005 | Chang et al. |
| 6,948,165 | B1 | 9/2005 | Luu et al. |
| 6,975,644 | B2 | 12/2005 | Tordera et al. |
| 7,050,840 | B2 | 5/2006 | Lin et al. |
| 7,055,956 | B2 | 6/2006 | Olson et al. |
| 7,055,965 | B2 | 6/2006 | Koba |
| 7,099,304 | B2 | 8/2006 | Liu et al. |
| 7,102,691 | B2 | 9/2006 | Dischert et al. |
| 7,127,541 | B2 | 10/2006 | Govindarajulu et al. |
| 7,136,914 | B2 | 11/2006 | Motoyama |
| 7,143,408 | B2 | 11/2006 | Anderson et al. |
| 7,149,834 | B2 | 12/2006 | Peters et al. |
| 7,174,535 | B2 | 2/2007 | Wragge |
| 7,237,046 | B2 | 6/2007 | Paley et al. |
| 7,243,153 | B2 | 7/2007 | McIntyre et al. |
| 7,318,086 | B2 | 1/2008 | Chang et al. |
| 7,353,416 | B2 | 4/2008 | Jeansonne et al. |
| 7,370,090 | B2 | 5/2008 | Nakaoka et al. |
| 7,484,245 | B1 | 1/2009 | Friedman et al. |
| 7,609,402 | B2 | 10/2009 | Chang et al. |

(56) References Cited

U.S. PATENT DOCUMENTS

| | | | |
|---|---|---|---|
| 7,704,147 B2* | 4/2010 | Quraishi et al. | 463/42 |
| RE41,416 E | 7/2010 | Liu et al. | |
| RE41,487 E | 8/2010 | Liu et al. | |
| RE41,532 E | 8/2010 | Liu et al. | |
| RE41,689 E | 9/2010 | Liu et al. | |
| 7,805,720 B2 | 9/2010 | Chang et al. | |
| RE41,882 E | 10/2010 | Liu et al. | |
| 7,908,401 B2 | 3/2011 | Chang | |
| 7,941,541 B2 | 5/2011 | Chang et al. | |
| 7,944,577 B2 | 5/2011 | Chang et al. | |
| 7,953,818 B2 | 5/2011 | Chang et al. | |
| RE42,725 E | 9/2011 | Chang et al. | |
| RE42,828 E | 10/2011 | Liu et al. | |
| RE43,181 E | 2/2012 | Liu et al. | |
| 8,166,949 B2 | 5/2012 | Hicks et al. | |
| 8,169,649 B2 | 5/2012 | Chang et al. | |
| 8,184,324 B2 | 5/2012 | Chang et al. | |
| 8,285,802 B2 | 10/2012 | Chang et al. | |
| 8,296,757 B2 | 10/2012 | Chang et al. | |
| 8,332,521 B2 | 12/2012 | Chang et al. | |
| 8,533,352 B2 | 9/2013 | Chang | |
| 8,595,717 B2 | 11/2013 | Chang et al. | |
| 8,630,000 B2 | 1/2014 | Chang et al. | |
| 8,705,097 B2 | 4/2014 | Chang et al. | |
| 8,711,408 B2 | 4/2014 | Chang et al. | |
| 8,812,398 B2 | 8/2014 | Kuhn et al. | |
| 8,964,220 B2 | 2/2015 | Chang et al. | |
| 8,972,610 B2 | 3/2015 | Chang | |
| 8,989,064 B2 | 3/2015 | Chang et al. | |
| 9,036,181 B2 | 5/2015 | Chang et al. | |
| 9,037,088 B2 | 5/2015 | Chang et al. | |
| 9,042,811 B2 | 5/2015 | Chang et al. | |
| 9,043,482 B2 | 5/2015 | Chang | |
| 2001/0029531 A1 | 10/2001 | Ohta | |
| 2001/0032254 A1 | 10/2001 | Hawkins | |
| 2002/0012329 A1 | 1/2002 | Atkinson | |
| 2002/0026492 A1 | 2/2002 | Fujita | |
| 2002/0032855 A1 | 3/2002 | Neves | |
| 2002/0065098 A1 | 5/2002 | Hosogaya | |
| 2002/0065872 A1 | 5/2002 | Genske | |
| 2002/0078367 A1 | 6/2002 | Lang | |
| 2002/0081993 A1 | 6/2002 | Toyoshima | |
| 2002/0083151 A1 | 6/2002 | Adams | |
| 2002/0083430 A1 | 6/2002 | Kusuda | |
| 2002/0091843 A1 | 7/2002 | Vaid | |
| 2002/0097408 A1 | 7/2002 | Chang et al. | |
| 2002/0097415 A1 | 7/2002 | Chang et al. | |
| 2002/0097416 A1 | 7/2002 | Chang et al. | |
| 2002/0097417 A1 | 7/2002 | Chang et al. | |
| 2002/0097418 A1 | 7/2002 | Chang et al. | |
| 2002/0097419 A1 | 7/2002 | Chang et al. | |
| 2002/0097433 A1 | 7/2002 | Chang | |
| 2002/0101515 A1 | 8/2002 | Yoshida et al. | |
| 2002/0108054 A1 | 8/2002 | Moore et al. | |
| 2002/0145632 A1 | 10/2002 | Shmueli et al. | |
| 2002/0147912 A1 | 10/2002 | Shmueli et al. | |
| 2002/0174254 A1 | 11/2002 | Kita et al. | |
| 2002/0178295 A1 | 11/2002 | Buczek et al. | |
| 2003/0028797 A1 | 2/2003 | Long et al. | |
| 2003/0046447 A1 | 3/2003 | Kouperchliak et al. | |
| 2003/0084256 A1 | 5/2003 | McKee | |
| 2003/0087601 A1 | 5/2003 | Agam et al. | |
| 2003/0110371 A1 | 6/2003 | Yang et al. | |
| 2003/0110372 A1 | 6/2003 | Proudler | |
| 2003/0112975 A1 | 6/2003 | Taiwanese | |
| 2003/0120754 A1 | 6/2003 | Muto et al. | |
| 2003/0122934 A1 | 7/2003 | Shiohara | |
| 2003/0160993 A1 | 8/2003 | Kang | |
| 2003/0182456 A1 | 9/2003 | Lin et al. | |
| 2003/0196007 A1 | 10/2003 | Baron | |
| 2003/0200372 A1 | 10/2003 | Doragh et al. | |
| 2003/0208629 A1 | 11/2003 | Parkman | |
| 2003/0225971 A1 | 12/2003 | Oishi et al. | |
| 2004/0006648 A9 | 1/2004 | Kita et al. | |
| 2004/0015709 A1 | 1/2004 | Chen et al. | |
| 2004/0057075 A1 | 3/2004 | Stewart et al. | |
| 2004/0070379 A1 | 4/2004 | Koretsky et al. | |
| 2004/0078708 A1 | 4/2004 | Li et al. | |
| 2004/0095382 A1 | 5/2004 | Fisher et al. | |
| 2004/0177355 A1 | 9/2004 | Wragge | |
| 2004/0203694 A1 | 10/2004 | Wong et al. | |
| 2005/0005149 A1 | 1/2005 | Hirota et al. | |
| 2005/0005263 A1 | 1/2005 | Miyazaki | |
| 2005/0055690 A1* | 3/2005 | Cornillon et al. | 717/174 |
| 2005/0246436 A1 | 11/2005 | Day et al. | |
| 2006/0080517 A1 | 4/2006 | Brown | |
| 2006/0173980 A1 | 8/2006 | Kobayashi et al. | |
| 2007/0081486 A1 | 4/2007 | Koide | |
| 2007/0240154 A1* | 10/2007 | Gerzymisch et al. | 717/174 |
| 2007/0288611 A1 | 12/2007 | Serceki et al. | |
| 2008/0003947 A1 | 1/2008 | Morris | |
| 2008/0049740 A1 | 2/2008 | Serceki et al. | |
| 2008/0071935 A1 | 3/2008 | Ohta | |
| 2008/0126628 A1 | 5/2008 | Mullis et al. | |
| 2009/0182903 A1 | 7/2009 | Tordera | |
| 2009/0198839 A1 | 8/2009 | Banerjee et al. | |
| 2009/0210868 A1* | 8/2009 | Parthasarathy | 717/169 |
| 2010/0174631 A1* | 7/2010 | Tian et al. | 705/35 |
| 2010/0201996 A1 | 8/2010 | Chang et al. | |
| 2010/0203824 A1 | 8/2010 | Chang et al. | |
| 2010/0227550 A1 | 9/2010 | Chang et al. | |
| 2011/0016280 A1 | 1/2011 | Chang et al. | |
| 2011/0034150 A1 | 2/2011 | Chang et al. | |
| 2011/0035682 A1 | 2/2011 | Chang et al. | |
| 2011/0138378 A1 | 6/2011 | Chang et al. | |
| 2011/0167166 A1 | 7/2011 | Chang | |
| 2011/0167175 A1 | 7/2011 | Chang | |
| 2011/0211226 A1 | 9/2011 | Chang et al. | |
| 2011/0279829 A1 | 11/2011 | Chang et al. | |
| 2011/0279863 A1 | 11/2011 | Chang et al. | |
| 2012/0096451 A1* | 4/2012 | Tenbarge et al. | 717/170 |
| 2012/0230315 A1 | 9/2012 | Chang et al. | |
| 2012/0258700 A1 | 10/2012 | Chang et al. | |
| 2013/0095887 A1 | 4/2013 | Chang et al. | |
| 2013/0103775 A1 | 4/2013 | Chang et al. | |
| 2013/0104052 A1 | 4/2013 | Chang et al. | |
| 2013/0109353 A1 | 5/2013 | Chang et al. | |
| 2013/0111459 A1* | 5/2013 | Nakamoto | 717/172 |
| 2014/0018130 A1 | 1/2014 | Chang | |

FOREIGN PATENT DOCUMENTS

| | | |
|---|---|---|
| EP | 1072976 A2 | 7/2000 |
| WO | 9526703 A1 | 10/1995 |
| WO | 0006904 A1 | 2/2000 |
| WO | 0125870 | 4/2001 |
| WO | 0241118 A2 | 5/2002 |
| WO | 03015641 A1 | 2/2003 |
| WO | 2004093149 A2 | 10/2004 |

OTHER PUBLICATIONS

D'Hooge, The Communicating PC, IEEE Communications Magazine Apr. 1996, pp. 36-42.*

Vetvitskii et al., Use of the USB Universal Serial Bus in Computer Medical Systems, Biomedical Engineering, vol. 34, No. 4, 2000, pp. 167-172.*

European Patent Office, Office Action for European Patent Application No. 04759486.6, Mar. 19, 2014, 3 pages.

U.S. Patent and Trademark Office, Office Action for U.S. Appl. No. 10/734,481, Apr. 3, 2014, 22 pages.

U.S. Patent and Trademark Office, Office Action for U.S. Appl. No. 14/021,974, May 16, 2014, 47 pages.

U.S. Patent and Trademark Office, Notice of Allowance for U.S. Appl. No. 10/734,481, Aug. 27, 2014, 23 pages.

U.S. Patent and Trademark Office, Office Action Regarding U.S. Appl. No. 10/823,513, Feb. 8, 2007, 60 pages.

U.S. Patent and Trademark Office, Office Action Regarding U.S. Appl. No. 10/823,513, Oct. 31, 2007, 86 pages.

U.S. Patent and Trademark Office, Office Action Regarding U.S. Appl. No. 10/823,513, Dec. 29, 2008, 28 pages.

U.S. Patent and Trademark Office, Office Action Regarding U.S. Appl. No. 10/823,513, Dec. 17, 2009, 32 pages.

(56) References Cited

OTHER PUBLICATIONS

U.S. Patent and Trademark Office, Notice of Allowance Regarding U.S. Appl. No. 10/823,513, Jun. 1, 2010, 43 pages.
U.S. Patent and Trademark Office, Notice of Allowance Regarding U.S. Appl. No. 12/890,487, Jun. 20, 2012, 10 pages.
U.S. Patent and Trademark Office, Office Action Regarding U.S. Appl. No. 12/891,594, Jul. 5, 2012, 56 pages.
US Patent and Trademark Office, Notice of Allowance Regarding U.S. Appl. No. 12/891,594, Jan. 18, 2013, 11 pages.
U.S. Patent and Trademark Office, Notice of Allowance Regarding U.S. Appl. No. 12/891,594, Jul. 22, 2013, 26 pages.
US Patent and Trademark Office, Office Action Regarding U.S. Appl. No. 10/734,481, Mar. 24, 2008, 33 pages.
US Patent and Trademark Office, Office Action Regarding U.S. Appl. No. 10/734,481, Jan. 6, 2009, 43 pages.
US Patent and Trademark Office, Ex Parte Quayle regarding U.S. Appl. No. 10/734,481, Dec. 8, 2009, 40 pages.
US Patent and Trademark Office, Office Action Regarding U.S. Appl. No. 10/734,481, Aug. 2, 2011, 68 pages.
US Patent and Trademark Office, Office Action Regarding U.S. Appl. No. 10/734,481, Apr. 4, 2012, 83 pages.
US Patent and Trademark Office, Office Action Regarding U.S. Appl. No. 10/734,481, Nov. 7, 2012, 86 pages.
US Patent and Trademark Office, Office Action Regarding U.S. Appl. No. 10/734,481, Sep. 10, 2013, 28 pages.
US Patent and Trademark Office, Office Action Regarding U.S. Appl. No. 10/734,484, Sep. 2, 2008, 44 pages.
US Patent and Trademark Office, Notice of Allowance Regarding U.S. Appl. No. 10/734,484, Oct. 28, 2010, 20 pages.
US Patent and Trademark Office, Office Action Regarding U.S. Appl. No. 13/047,672, Jan. 20, 2012, 58 pages.
US Patent and Trademark Office, Office Action Regarding U.S. Appl. No. 13/047,672, Nov. 6, 2012, 34 pages.
US Patent and Trademark Office, Office Action Regarding U.S. Appl. No. 13/047,672, Aug. 1, 2013, 25 pages.
US Patent and Trademark Office, Office Action Regarding U.S. Appl. No. 13/047,674, Mar. 14, 2012, 38 pages.
US Patent and Trademark Office, Notice of Allowance Regarding U.S. Appl. No. 13/047,674, Nov. 6, 2012, 34 pages.
US Patent and Trademark Office, Notice of Allowance Regarding U.S. Appl. No. 13/047,674, Apr. 29, 2013, 15 pages.
US Patent and Trademark Office, Office Action Regarding U.S. Appl. No. 13/103,958, Nov. 16, 2012, 41 pages.
US Patent and Trademark Office, Office Action Regarding U.S. Appl. No. 14/021,974, Nov. 22, 2013, 21 pages.
US Receiving Office, International Search Report regarding PCT Application No. PCT/US01/48057; Jan. 6, 2003; 1 page.
US Receiving Office, International Preliminary Examination Report regarding PCT Application No. PCT/US/48057, Aug. 24, 2004, 11 pages.
WIPO (Jason D. Cardone, authorized officer), "International Search Report" for PCT/US2003/039547; mailed Jul. 15, 2005; 4 pages.
WIPO (Thomas C. Lee, authorized officer), "International Search Report" for PCT/US2004/011372; mailed Jun. 20, 2007; 3 pages.
William Ho Chang is an inventor for both PCT/US2004/011372 and U.S. Appl. No. 10/734,481.
WIPO (Ellen Moyse and Thomas C. Lee, authorized officers), "International Preliminary Examination Report and Written Opinion" for PCT/US2004/011372; mailed Aug. 14, 2007; 8 pages. William Ho Chang is an inventor for both PCT/US2004/011372 and U.S. Appl. No. 10/734,481.
State Intellectual Property Office of the P.R.C., Office Action Regarding Chinese Patent Application No. 200480016309.4, May 8, 2009, 10 pages.
State Intellectual Property Office of the P.R.C., Office Action Regarding Chinese Patent Application No. 200480016309.4, May 24, 2011, 11 pages.
State Intellectual Property Office of the P.R.C., Office Action Regarding Chinese Patent Application No. 200480016309.4, Oct. 28, 2011, 6 pages.
European Patent Office, Office Action Regarding European Patent Application No. 01985549.3, Oct. 26, 2010, 4 pages.
European Patent Office, Office Action Regarding European Patent Application No. 04759486.6, Dec. 23, 2011, 11 pages.
Attiaoui et al., "Conception of Data Base Management Systems in USB Smart Card Flash Memory: Application for the Cancer Pathology of Medical Information Systems," SETIT 2005: 3rd International Conference: Sciences of Electronic Technologies of Information and Telecommunications, Mar. 27-31, 2005, pp. 1-7.
Tahir et al., "Analysis of AutoPlay Feature via the USB Flash Drives," WCE 2008: Proceedings of the World Congress of Engineering, Jul. 2-4, 2008, pp. 1-4.
Wiener et al., "Meeting USB and IEEE1394 overcurrent protection requirements using PolySwitch devices," IEEE Wescon/97 Conference Proceedings, Nov. 1997 pp. 442-475.
Remple, "USB on-the-go interface for portable devices," IEEE, Jun. 2003, pp. 8-9.
Jankovec et al., "Analog circuit development system," IEEE, Sep. 2003, vol. 1, pp. 125-129.
Hamid et al., "Analysis of Autoplay Feature via the USB Flash Drives," Proceedings of the World Congress on Engineering, Jul. 2-4, 2008, vol. 1, pp. 1-4.
Jebarajan et al., "A Method for Designing a Operating System for Plug and Play Bootstrap Loader USB Drive," International Journal of Computer Science, Jan. 2011, vol. 8, Issue 1, pp. 295-301.
David, Jon, "Security in a Flash," Computers & Security, Jan. 1, 2003, vol. 22, No. 1, pp. 29-33, Elsevier Science Publishers, Amsterdam, NL.
Haynie, Dave, "The Zorro III Bus Specification: A General Purpose Expansion Bus for High Performance Amiga Computers," Mar. 20, 1991, Revision 1.0, pp. 1-84.
State Intellectual Property Office of the P.R.C., Office Action Regarding Chinese Patent Application No. 200480016309.4, Aug. 5, 2013, 18 pages.
European Patent Office, Office Action regarding European Patent Application No. 04759486.6, Jan. 8, 2014, 14 pages.
Geroski, Ray, "Take your data anywhere with these four USB miniature storage devices," Sep. 23, 2002, 6 pages.
Roth, Ed, "Storage in a Flash," Dec. 15, 2002, 4 pages.
M-Systems, "Mobile DiskOnChip Plus 32/64MByte, Flash Disk with Protection and Security-Enabling Features," 2002, 50 pages.
State Intellectual Property Office of the P.R.C., Office Action Regarding Chinese Patent Application No. 200480016309.4, Apr. 3, 2014, 14 pages.
European Patent Office, Office Action for European Patent Application No. 04759486.6, May 22, 2014, 43 pages.
U.S. Patent and Trademark Office, Office Action for U.S. Appl. No. 13/047,672, Jun. 25, 2014, 30 pages.
U.S. Patent and Trademark Office, Office Action for U.S. Appl. No. 14/021,974, Sep. 9, 2014, 17 pages.
US Patent and Trademark Office, Notice of Allowance for U.S. Appl. No. 13/047,672, Dec. 24, 2013, 21 pages.
U.S. Patent and Trademark Office, Notice of Allowance for U.S. Appl. No. 13/047,672, Oct. 17, 2014, 33 pages.
United States Patent and Trademark Office, Notice of Allowance for U.S. Appl. No. 10/734,481, Dec. 23, 2014, 15 pages.
United States Patent and Trademark Office, Notice of Allowance for U.S. Appl. No. 14/021,974, Dec. 19, 2014, 24 pages.
State Intellectual Property Office of the P.R.C., Office Action Regarding Chinese Patent Application No. 200480016309.4, Sep. 29, 2014, 17 pages.
United States Patent and Trademark Office, Notice of Allowance for U.S. Appl. No. 10/734,481, Apr. 14, 2015, 18 pages.

\* cited by examiner

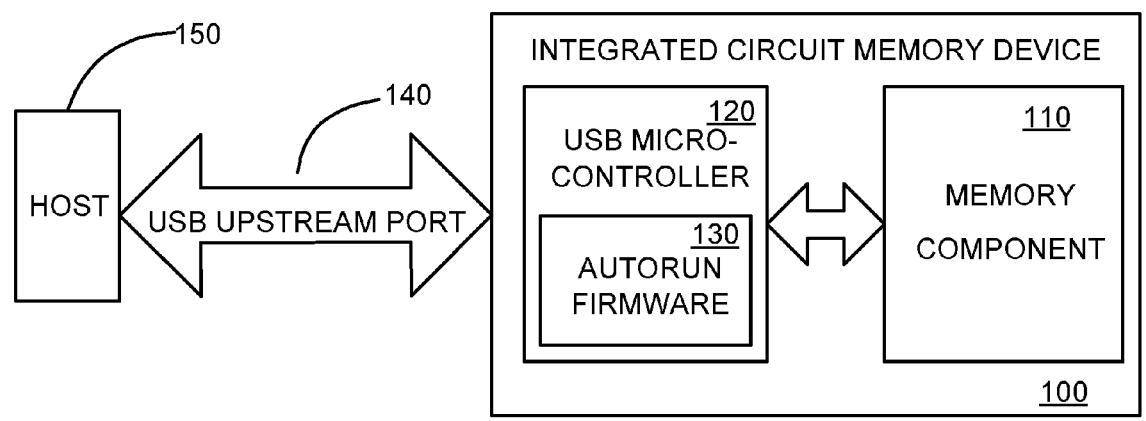
Fig. 1
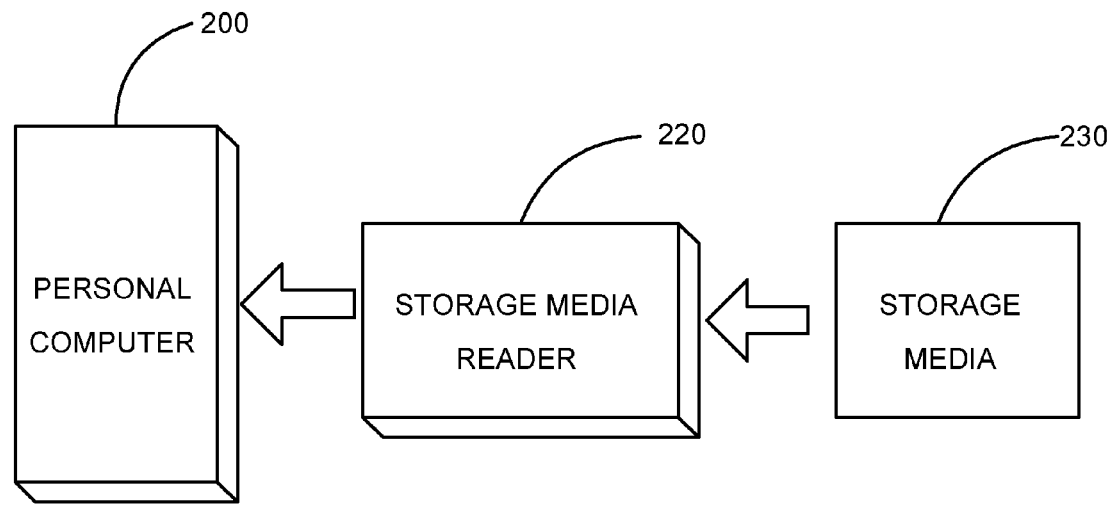
Fig. 2 – PRIOR ART

COMMUNICATION DEVICE OR MEDIA DEVICE FOR PROVIDING PHONE CALLING SERVICE, INTERNET ACCESS SERVICE, OR DIGITAL CONTENT SERVICE

CROSS-REFERENCES TO RELATED APPLICATIONS

This application is a continuation of U.S. patent application Ser. No. 12/891,594, filed on Sep. 27, 2010, now U.S. Pat. No. 8,595,717, which is (1) a continuation of U.S. patent application Ser. No. 10/823,513, filed on Apr. 12, 2004, now U.S. Pat. No. 7,805,720, which claims the benefit of U.S. Provisional Patent Application Ser. No. 60/462,080, filed on Apr. 11, 2003; and (2) a continuation-in-part of allowed U.S. patent application Ser. No. 10/734,481, filed on Dec. 12, 2003, which claims the benefit of U.S. Provisional Patent Application Ser. No. 60/433,196, filed on Dec. 12, 2002. The complete disclosures of the above patent applications are hereby incorporated by reference for all purposes.

TECHNICAL FIELD

This invention relates to a system and method for utilizing storage media such as flash memory for achieving autorun of an application executable or installer stored on the storage media.

BACKGROUND AND SUMMARY OF THE INVENTION

As is known in the art, some applications such as software installers may be run automatically upon insertion of a CD-ROM disc into a CD-ROM drive, which may sometimes be called a dock or reader. In operation, this automatic running of an application is provided by an autorun feature that is stored on or incorporated into CD-ROM drive dock/reader. Executables or installers stored on the CD-ROM disc are executed by the host personal computer based upon activation by the autorun feature in the CD-ROM drive dock/reader. In this implementation, the autorun feature is incorporated into the hardware drive/dock/reader, which is separate from the storage media.

Universal Serial Bus (USB) technology is rapidly gaining preference as the interfacing technology of choice for peripherals on computing devices such as personal or laptop computers. Flash memories coupled with a USB interface has become a convenient and portable storage device that can replaces floppy disks and compact disks (CDs).

However, the popular and widely-adopted Universal Serial Bus technology does not include distinct autorun features in the docks/readers. As a consequence, conventional integrated circuit memory devices such as USB memory devices do not have autorun functionality.

Accordingly, the present invention provides autorun functionality to any IC memory device, such as any USB peripheral, that has a memory component interfaced to a computing device interface microcontroller. The present invention provides autorun of one or more executables or application installers from a memory component with an interface to a computing device without an intermediate hardware-based autorun feature. As an example, such interface could be a USB interface and such computing device could be a personal computer.

For example, each USB peripheral device internally contains a USB microcontroller that performs the functionality associated with identifying the device to a host computing device, such as a personal computer. In accordance with the present invention, autorun firmware is embedded into the USB microcontroller. The autorun firmware enables autorun of an installable or executable application stored on the memory component of the USB device. The firmware acts as bridge component translating all commands and interactions between a host PC and the memory component.

Additional description and implementations of the present invention will be apparent from the detailed description of the preferred embodiment thereof, which proceeds with reference to the accompanying drawings.

BRIEF DESCRIPTIONS OF THE DRAWINGS

FIG. 1 illustrates an exemplary implementation of an autorun integrated circuit (IC) memory device according to the present invention.

FIG. 2 is a block diagram of a prior art arrangement in which a host personal computer includes an intermediate hardware dock that provides an autorun feature.

DETAILED DESCRIPTION OF PREFERRED EMBODIMENT

Figure 3:
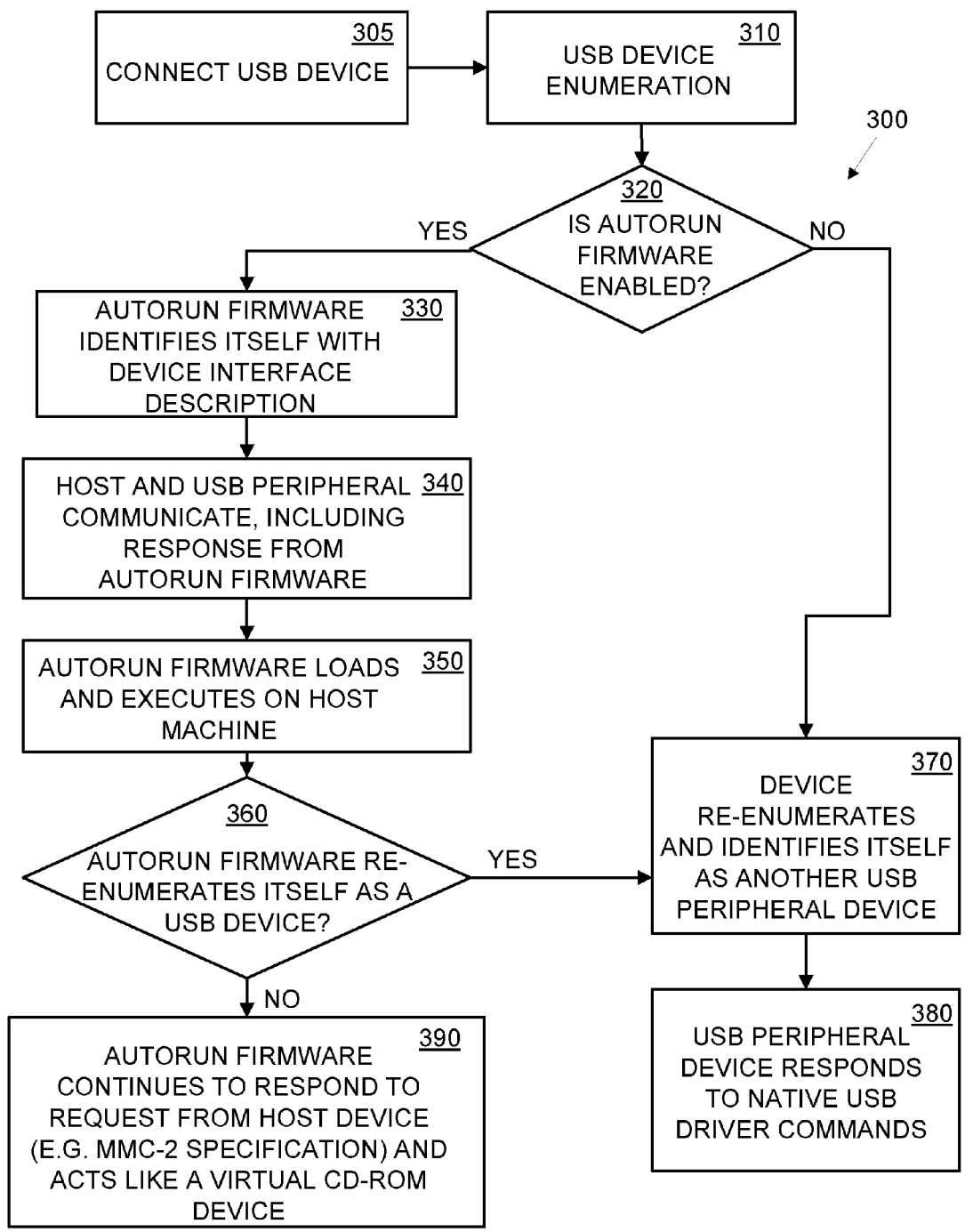
FIG. 3 is a flow diagram of an IC memory device autorun method.

FIG. 1 illustrates an exemplary implementation of an autorun integrated circuit (IC) memory device 100 according to the present invention. Autorun IC memory device may be in the form of a USB memory device, a compact flash card, a smart card, etc. For purposes of illustration, autorun IC memory device 100 will be described with reference to a universal serial bus (USB) memory device implementation.

Autorun IC memory device 100 includes a memory component 110 that communicates with a USB microcontroller 120 having autorun firmware 130 incorporated or embedded into microcontroller 120. Autorun IC memory device 100 includes an upstream port 140 for connecting to a host computing device 150 (e.g., personal or laptop computer, handheld computer, PDA, smart phone, etc., not shown). In the illustrated implementation, upstream port 140 is a USB port.

Autorun firmware 130 causes an application or executable stored in memory component 110 to be installed or run automatically upon activation of the IC memory device 100 vis-à-vis the host computing device 150. This activation may be achieved in a variety of ways including connecting or inserting the autorun IC memory device 100 into a docking system or port present on or interfaced to the host computing device 150. For example, IC memory device 100 with autorun firmware 130 incorporated into USB microcontroller 120 allows a "USB Flash Drive" storing one or more application executables or installables to be run automatically (i.e., autorun) upon activation, such as being plugged into the USB port of a host PC 150.

FIG. 2 is a block diagram of a prior art arrangement in which a host personal computer 200 includes an intermediate hardware dock 220 that provides an autorun feature for a storage medium like a CD-ROM 230. Intermediate hardware dock 220 functions as a storage media reader that may be internally integrated with or externally connected to the host personal computer 200 and the storage medium 230.

In this prior art implementation, insertion of a CD-ROM disc 230 into a CD-ROM dock/reader 220 may cause activation of an autorun feature that is stored on or incorporated into CD-ROM dock/reader 220. Executables or installers stored on the CD-ROM disc 230 may then be executed by the host personal computer 200 based upon activation by the autorun feature CD-ROM dock/reader 220.

As another example of such a prior art implementation, a flash memory card reader connected to a host computing device, such as a personal computer, may also include an autorun feature that can activate an executable or installer to run on the host computing device.

A disadvantage of such prior art implementations is that autorun features are incorporated into hardware docks or readers that are separate from the storage media. However, the popular and widely-adopted Universal Serial Bus technology does not include such distinct autorun features. As a consequence, conventional integrated circuit memory devices such as USB memory devices do not have autorun functionality. In contrast, the present invention provides autorun functionality to any IC memory device, such as any USB peripheral that has a memory component interfaced to a USB microcontroller.

FIG. 3 is a flow diagram of an IC memory device autorun method 300 that may be implemented from firmware 130 incorporated into a USB controller 120.

In step 305, a USB peripheral is inserted into or connected to a USB port of a host computing device (e.g., a personal computer).

In step 310, the host computing device performs an enumeration to identify the newly attached USB peripheral.

Step 320 is a query as to whether the USB peripheral includes autorun firmware that is enabled. If so, step 320 proceeds to step 330. If not, step 320 proceeds to step 370.

In step 330, the autorun firmware in the USB peripheral announces itself with a device interface description. For example, the device interface description may include Mass Storage Class, SCSI transparent command set, Bulk Only Transport corresponding to a CD-ROM, for example.

In step 340, the host and the USB peripheral communicate with each other using, for example a standard MMC-2 specification set. The communication includes a response to host commands from the autorun firmware according to the MMC-2 specification. As a part of the MMC-2 specification, the host requests enumeration of files in root directory and the autorun firmware responds to the request.

In step 350, the autorun firmware informs the host of the presence of an autorun executable file to be executed and provides the file to the host. For example, the file may be named "Autorun.inf," which may be stored on the memory component of the USB peripheral. The host executes the autorun executable file to provide the autorun functionality.

Step 360 is a query whether the autorun firmware is to be enumerated again or "re-enumerated." If so, step 360 proceeds to step 370. If not, step 360 proceeds to step 390. Re-enumeration allows the autorun firmware to announce itself to the host as one or more other USB peripherals (e.g. data storage device, communication adapter, etc.) or, if there is no re-enumeration, the autorun firmware can continue to function as per MMC-2 specifications.

In step 370, the autorun firmware re-enumerates or identifies itself as another USB device, such as a USB flash drive or a USB wireless (e.g., Bluetooth, WiFi, IrDA) device or "dongle." With such a re-enumeration, the autorun firmware identifies itself with device interface descriptors for the other USB devices (e.g., USB flash drive or USB Bluetooth dongle).

In step 380, the autorun firmware loads the firmware associated with the enumerated USB peripheral (e.g., USB flash drive or USB Bluetooth dongle).

In step 390, the autorun firmware is configured to not re-enumerate itself and continues to act as a virtual CD-ROM type device implementing the MMC-2 specifications.

Process steps 320, 330, 340, 350 and 360 correspond to the autorun firmware implementation. Step 390 provides for the implementation of a virtual mass storage device from a memory component that implements SCSI command set and MMC-2 specifications.

Figure 4A:
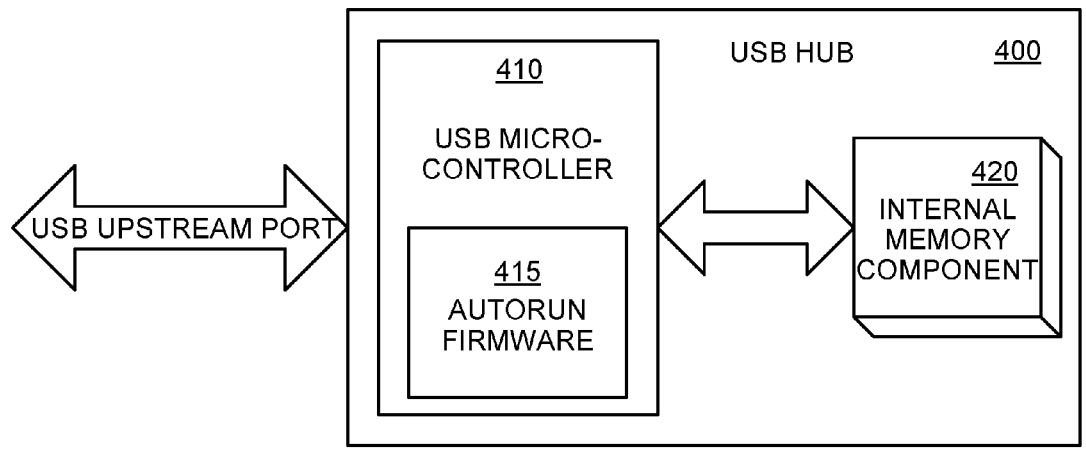
FIGS. 4A and 4B illustrate autorun firmware according to the present invention be embedded into alternative USB device configurations
Figure 4B:
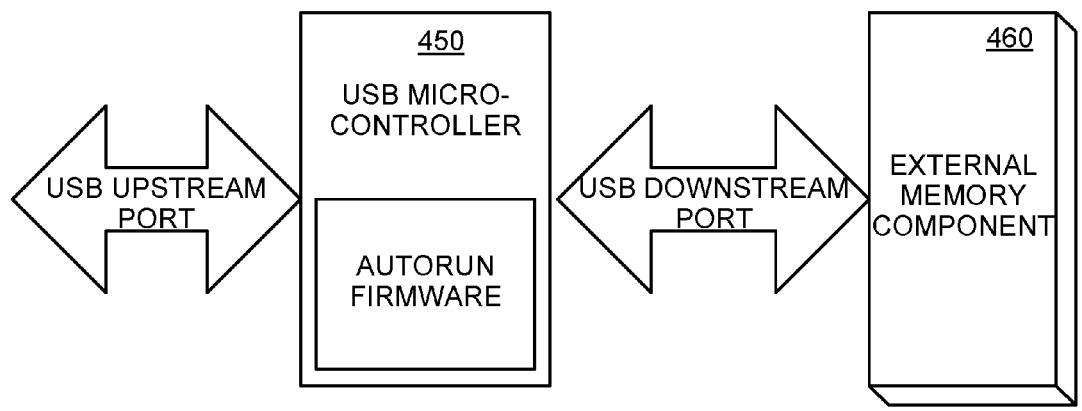

Autorun firmware according to the present invention can be embedded into multiple USB device configurations to provide a variety of unique USB peripherals with autorun functionality and into other peripheral devices with similar functionality. For example, FIG. 4A shows a USB hub 400 in which a USB microcontroller 410 with auto run firmware 415 communicates with an internal memory component 420. In FIG. 4B, a USB microcontroller 450 is connected to an external memory component 460 through a USB downstream port 470.

With reference to FIG. 4A, the USB microcontroller 410 that forms a part of the USB hub 400 typically is a repeater type entity allowing for cascaded multiple USB peripherals to connect through a single upstream port to a host system. The USB microcontroller 410 includes support for programming capability, which includes the autorun firmware 415. The Autorun firmware can then be ported to work on the USB microcontroller 410. The firmware may be stored on the internal memory component 420. Alternatively, the Autorun firmware may be stored on external memory that is in an attached USB memory component 430.

Figure 5:
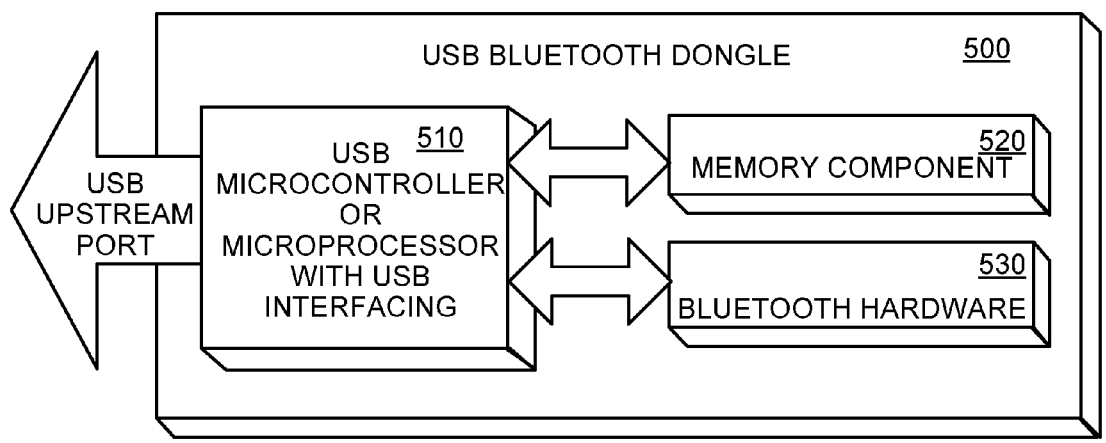
FIG. 5 is a block diagram of a USB peripheral having multiple functionalities.

As another configuration, FIG. 5 is a block diagram of a USB peripheral 500 having multiple functionalities. In this implementation, USB peripheral 500 includes an internal microprocessor with USB interfacing 510, or alternatively a USB microcontroller, that communicates with a memory component 520 and wireless (e.g., Bluetooth) networking hardware 530. As a result, USB peripheral 500 is capable of operating as a wireless (e.g., Bluetooth) networking device or "dongle" and as USB flash drive, both of which are accessible with autorun functionality In one configuration, the microprocessor 510 has USB interfacing ability. It is coupled with a memory component 520 and Bluetooth radio component 530. Microprocessor 510 implements client layers of the Bluetooth stack. The firmware that the microprocessor 510 executes is stored in memory component 520. The autorun firmware can also be additionally stored as a part of the functionality of existing firmware or separately in the memory component 520. In another configuration, the microprocessor 510 may not directly have USB interfacing capability and could use a separate USB microcontroller (not shown).

A feature of including autorun firmware in USB peripherals is that software applications can be bundled with the USB peripherals. The bundled software application may or may not utilize the USB peripheral.

Figure 6:
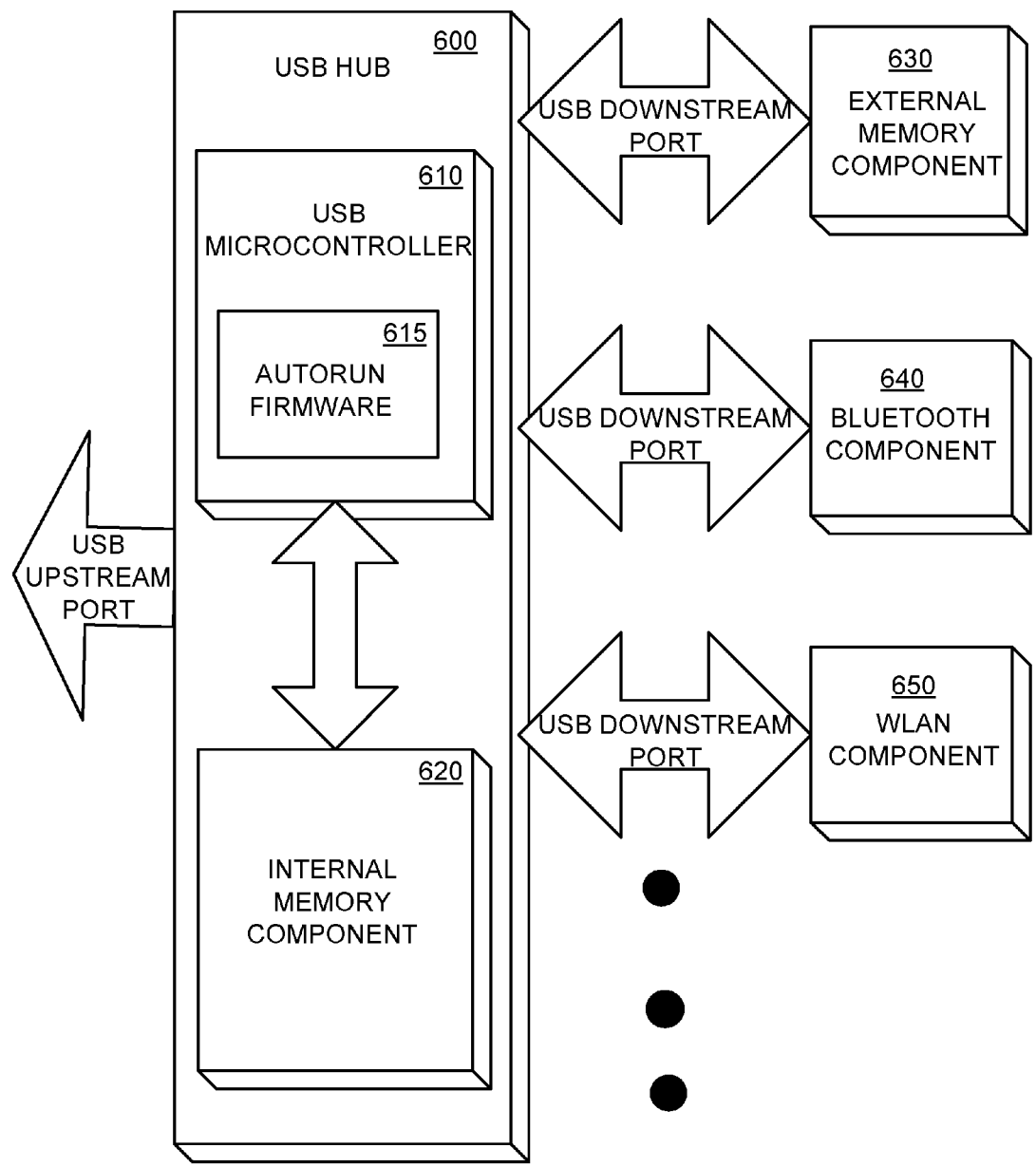
FIG. 6 is a block diagram of a USB hub with autorun firmware and access to multiple distinct functionalities.

As an example, FIG. 6 is a block diagram of a USB hub 600 that includes a USB microcontroller 610 with autorun firmware 615 and access to one or multiple distinct functionalities or USB peripherals, such as an external memory component 630, a Bluetooth networking component 640, or a WLAN component 650. Such USB peripherals 630-650 could be formed in combination with USB hub 600. USB hub 600 may be externally connected with one or more of these components 630-650, as illustrated, or alternatively one or more of the components 630-650 can be internally integrated to form a USB peripheral or device with multiple distinct functionalities.

There could be multiple executions of autorun firmware from each or some of these peripherals. Thus the autorun firmware allows for distribution of software (e.g. device drivers, synchronization software, etc.) that can be autorun along with any USB peripheral.

The implementation options also include mechanisms for allowing the autorun feature to be enabled or disabled by an external mechanism (e.g., switch) that is included on the device or peripheral. The switch could be manually operable by a person. The switch could be a simple two-mode (e.g., autorun on/off) switch or could be a switch that selects from among more than two modes.

Figure 7:
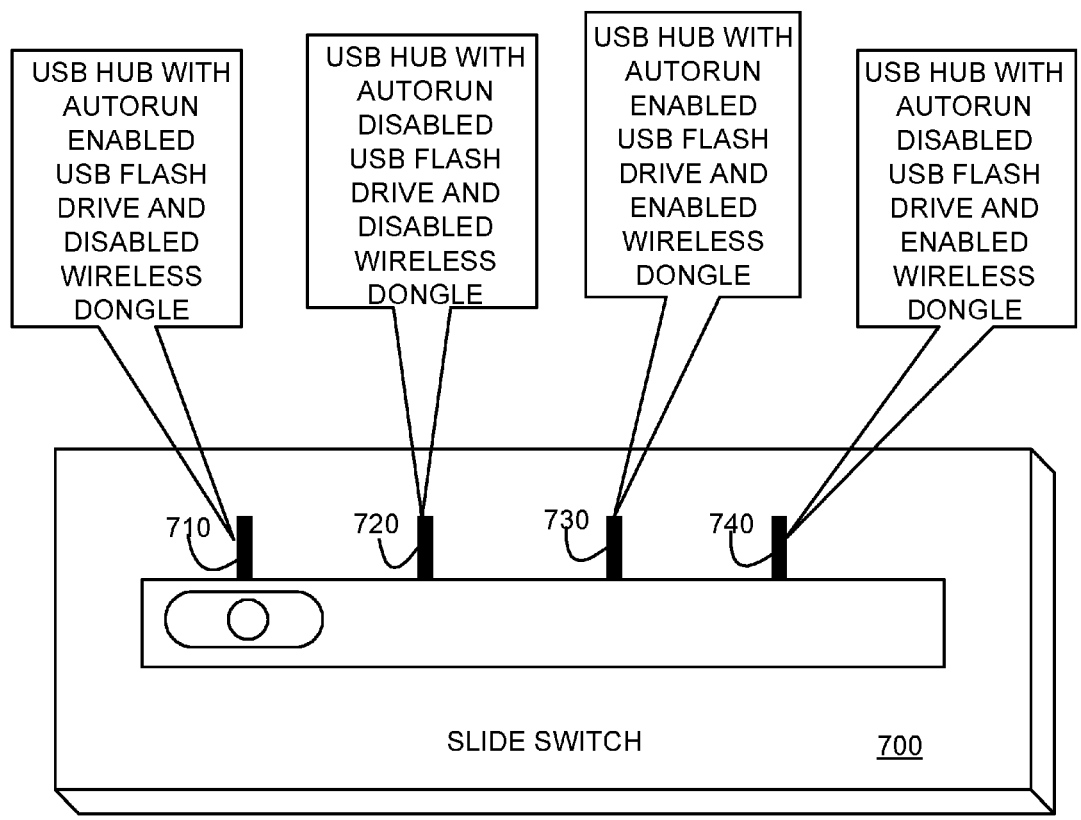
FIG. 7 is a schematic diagram of a person-operable physical slide switch.

FIG. 7 is a schematic diagram of a person-operable physical slide switch 700 that allows a person to select from among multiple modes, functionalities, or peripherals available on a USB device or "dongle." As an example, switch 700 relates to features or peripherals available from USB hub 600 of FIG. 6, including external memory component 630, and wireless dongle or module (640 or 650) for adding wireless (e.g. Bluetooth, WiFi, IrDA) interface to its host PC.

In this exemplary illustration, switch 700 has 4 user-selectable positions. In position 710, autorun functionality is enabled, the wireless component is disabled. In position 720, autorun functionality is disabled, wireless component is disabled. In position 730, autorun functionality is enabled, wireless component is enabled. In position 740, autorun functionality is disabled, wireless component is enabled.

The autorun firmware enables the distribution of software that can be autorun from a memory component. There is also a unique security mechanism that can be incorporated to protect the software that is installable or executable from the memory component by the autorun firmware.

A section of the internal memory component (e.g., memory component 620, FIG. 6) may be protected from public access by password protecting it or by physical security means such as a lock, among other means. The flash memory component can also be segmented into public and private sections. Private sections can be used to store installable or executables that cannot be viewed or accessed by the user, and public sections can be viewed or accessed by users in a conventional manner. The installable or executable software being distributed through the memory component can be stored in the protected region of the memory component. Security by way of copy protection of this installable software can be achieved by allowing only an application launcher executable, which is autorun from the memory component, to access the installable software.

In one implementation, the application launcher executable has the following characteristics: it is autorun from memory component, and it has access to the protected or private region of memory component. This access is gained by authenticating itself to the memory controller (e.g. USB microcontroller) and/or to the installable software in the protected region of the memory component. The authentication mechanism may be a password-based mechanism or a more involved cryptographic algorithm. Among the various techniques used for authentication are digital signatures and unique identifiers like the Bluetooth Device Address, MAC address, etc. The application launcher executable may authenticate itself directly to the memory controller software and/or installable software or to a separate authentication software that resides in the protected region of the memory component.

The application launcher executable may be built generically to execute any or all executables and installables that exist within the protected region of the memory component. Alternatively, the application launcher executable may be programmed to launch a particular executable or installable from the protected region. Considering the possibility of the memory component being segmented into "n" protected sections where n is greater than 1, the application launcher executable may access one or more of these sections in the mechanism described herein. The protected memory region may contain, for example, executable software (also called an application executable), or installable software (also called an application installable), or protected data.

Figure 8:
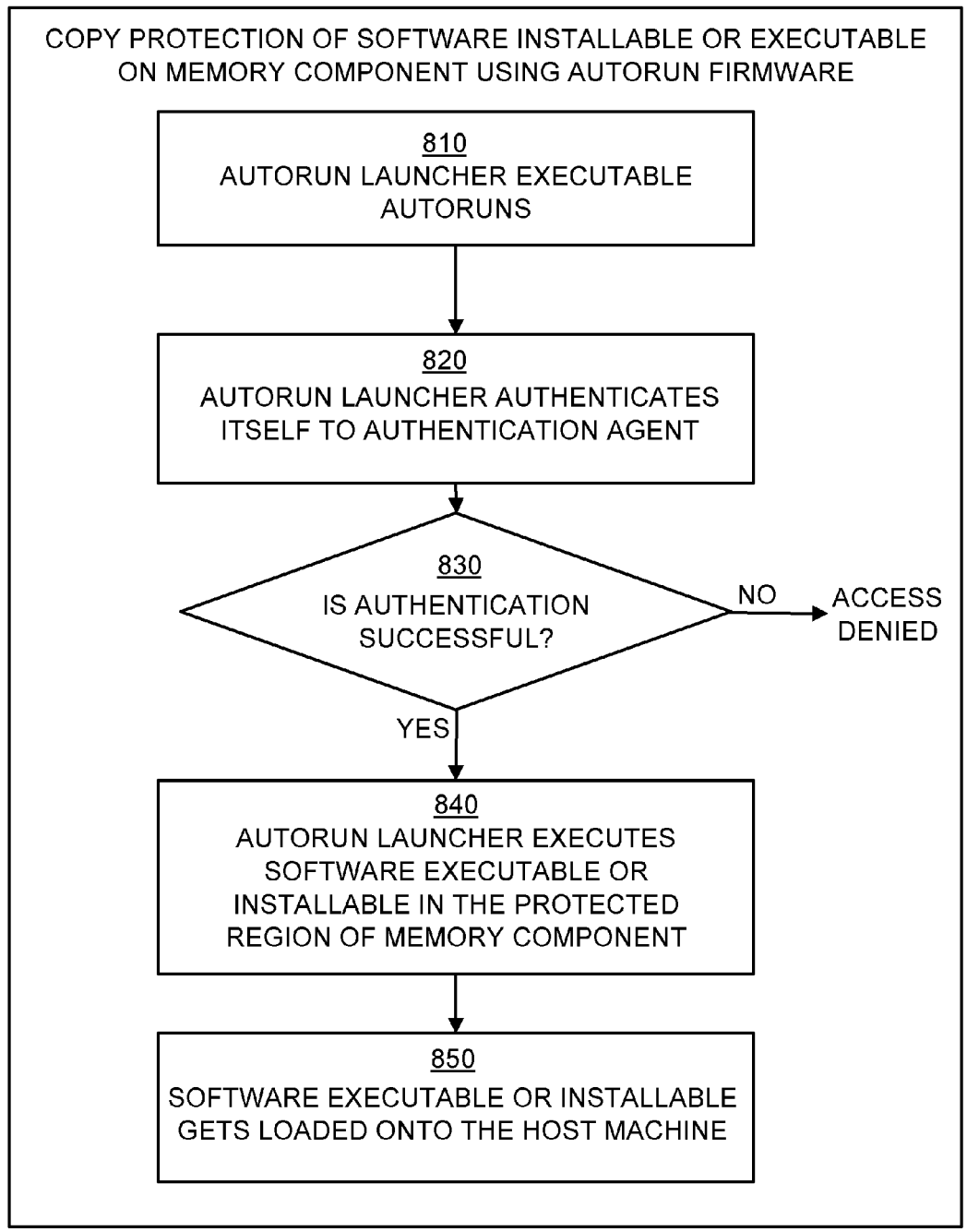
FIG. 8 is a flow diagram of a software-implemented copy protection method.

FIG. 8 is a flow diagram of a software-implemented copy protection method for protecting of software that is executable or installable on using autorun firmware.

In step 810, an application launcher executable that is stored in a memory component of an IC memory device is run automatically on a host computer by an autorun firmware stored on the IC memory device. The autorun firmware is operates automatically upon activation of the IC memory device, such as occurs when the memory device is plugged into a port or socket of the host computer.

In step 820, the application launcher authenticates itself to authentication agent software that resides in the protected region of the memory component. The authentication agent software may be incorporated within the software executable or installable that is being protected or may be a separate application. The authentication algorithm may be password based or may involve cryptographic techniques.

Step 830 is a query whether the authentication is successful. If not, access to the protected executable or installable is denied. If authentication is successful, step 830 proceeds to step 840 and the application launcher executable gains access to the protected memory region.

In step 840, the application launcher executable executes the application executable or installable that is stored in the protected region of the memory component. The application launcher executable may also be programmed to execute any or all executables and installables that exist within the protected region of the memory component.

In step 850, the executables and installables thus launched are executed on the host computer.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. An integrated circuit memory device connectable to a host computing device by a user for running computer software on the host computing device, the integrated circuit memory device comprising:
   a controller for controlling interaction between the integrated circuit memory device and the host computing device;
   a memory component storing a software component or data operable on the host computing device, the memory component including a protected or private memory component storing at least part of the software component or data, the at least part of the software component or data being associated with the computer software for running on the host computing device, the protected or private memory component not implemented to be a public memory area for storing data that are accessible or viewable by the user of the integrated circuit memory device upon connection and activation of the integrated circuit memory device on the host computing device, and the at least part of the software component or data stored in the protected memory component being permitted to be executed by the host computing device upon connection and activation of the integrated circuit memory device on the host computing device;

firmware embedded at least partly in the integrated circuit memory device having:
- means to facilitate interaction between the integrated circuit memory device and the host computing device,
- means to facilitate access of the protected memory or private component of the integrated circuit memory device,
- means to facilitate the integrated circuit memory device identifying itself with the host computing device in accordance with a device interface description, the device interface description identifying the integrated circuit memory device in a manner analogous to that of a CD-ROM (Compact Disc Read-Only Memory) drive or a mass storage class device, individually or in any combination; and autorun software stored on the integrated circuit memory device for running automatically on the host computing device upon connection of the integrated circuit memory device to the host computing device, the autorun software, when executed, providing:
- means to load, from the protected or private memory component, at least part of the software component or data associated with the computer software by interacting with the autorun firmware embedded in the integrated circuit memory device, and
- means to facilitate running of the computer software on the host computing device that includes at least part of the software component or data accessed from the protected or private memory component subsequent to connection and activation of the integrated circuit memory device to the host computing device; and wherein, the integrated circuit memory device is associated with providing a phone calling service, an Internet access service, or a digital content output service, individually or in any combination.

2. The integrated circuit memory device of claim 1, further comprising a wireless component for adding a wireless interface to the host computing device with the wireless component, and the computer software running on the host computing device relating, at least partly, to wireless software for running on the host computing device.

3. The integrated circuit memory device of claim 2, in which the wireless component conforms to one or more of a Bluetooth®, a Wi-Fi, a ZigBee, and an IrDa standard of wireless communication, individually or in any combination.

4. The integrated circuit memory device of claim 1, in which the means to load, from the protected or private memory component, the protected data by the autorun software authenticates access of the autorun software.

5. The integrated circuit memory device of claim 1, in which at least part of the software component or data includes a device identifier, an address, a MAC address, individually, or in any combination.

6. The integrated circuit memory device of claim 1 further includes a USB (Universal Serial Bus) device connectable to the host computing device.

7. The integrated circuit memory device of claim 1 being at least one of a USB (Universal Serial Bus) storage device or a wireless adapter device, individually, or in any combination.

8. The integrated circuit memory device of claim 1, in which the memory component further includes a public memory section, the contents of which can be viewed and accessed by a user, and at least a pointer to an autorun software or an application launcher is stored in the public memory section of the memory component for execution at the host computing device.

9. The integrated circuit memory device of claim 8, in which the computer software is for phone calling and for Internet access, individually or in any combination.

10. An autorun method for running on a host computing device selected software or data using an integrated circuit memory device that is connectable by a user to an external port of the host computing device, the integrated circuit memory device including:
- a memory component storing selected software or data operable on the host computing device, and
- a controller for controlling interaction between the integrated circuit memory device and the host computing device, the controller including autorun firmware to support loading of the selected software or data from the memory component of the integrated circuit memory device for running on the host computing device, the method comprising:

activating the integrated circuit memory device upon connection of the integrated circuit memory device to the host computing device;

informing the host computing device of the presence of the autorun software on the integrated circuit memory device;

executing, the autorun software on the host computing device, the autorun software running on the host computing device interacting with the autorun firmware included in the controller of the integrated circuit memory device for accessing the selected software or data stored in the memory component of the integrated circuit memory device;

loading, by the autorun software, at least part of the selected software or data stored in the memory component of the integrated circuit memory device;

running, by the autorun software, the selected software or data loaded from the memory component of the integrated circuit memory device on the host computing device;

identifying the integrated circuit memory device to the host computing device in accordance with a device interface description, the device interface description identifies the integrated circuit memory device in a manner analogous to that of a CD-ROM (Compact Disc Read-Only Memory) drive or a mass storage class device, individually or in any combination; and wherein the integrated circuit memory device is associated with providing a phone calling service, an Internet access service, or a digital content output service, individually or in any combination.

11. The method of claim 10, further comprising a wireless component for adding a wireless interface to the host computing device.

12. The method of claim 10, the integrated circuit memory device further comprising a USB (Universal Serial Bus) upstream port for interfacing with the host computing device and one or more additional USB (Universal Serial Bus) downstream ports.

13. The method of claim 10, in which the integrated circuit memory device includes a public memory section where at least part of the selected software or data operable on the host computer is stored, the contents of the public memory section being viewable and accessible by the user.

14. The method of claim 10, further comprising a USB (universal serial bus) interface and an Ethernet interface, individually or in any combination.

15. In a computer readable memory medium, non-transitory autorun software stored in an integrated circuit memory device connectable by a user to an external port of a host computing device for running on the host computing device protected software or data that can be executed by the host computing device using the integrated circuit memory device, the medium comprising:
  software for running on the host computing device autorun software upon connection of the integrated circuit memory device to the host computing device;
  software for identifying the integrated circuit memory device to the host computer with a device interface description, the device interface description identifying the integrated circuit memory device in a manner analogous to that of a CD-ROM (Compact Disc Read-Only Memory) drive or a mass storage class device, individually or in any combination;
  software for interacting with autorun firmware embedded in the integrated circuit memory device for accessing a protected memory component in the integrated circuit memory device, the protected memory component not implemented to be a public memory area for storing data that are accessible or viewable by the user but being accessible by the autorun software upon connection and activation of the integrated circuit memory device to the host computing device;
  software for loading at least part of the protected software or data from the protected memory component of the integrated circuit memory device:
  software for running and executing the protected software or data by the autorun software on the host computer; and
  wherein the integrated circuit memory device is associated with providing a phone calling service, an Internet access service, or a digital content output service, individually or in any combination.

16. The medium of claim 15, in which at least part of the protected software or data includes a device identifier.

17. The medium of claim 15, further comprising a non-protected or public memory section, the contents of which can be viewed and accessed by the user.

18. The medium of claim 17, in which at least part of the protected software or data is stored in the non-protected or public memory section, and the medium further comprising software for loading at least part of the protected software or data on the host computer from the non-protected or public memory section of the Integrated circuit memory device.

19. The medium of claim 15, in which the integrated circuit memory device is for providing a phone calling service and the integrated circuit memory device includes a USB (universal serial bus) interface for USB connection and an Ethernet interface for Ethernet connection, individually or in any combination.

20. The medium of claim 15, in which the integrated circuit memory device further includes a wireless component for wireless connection, and the protected software or data is related to wireless software running on the host computing device.

* * * * *